United States Patent [19]

Mottram et al.

[11] Patent Number: 4,576,616
[45] Date of Patent: Mar. 18, 1986

[54] METHOD AND APPARATUS FOR CONCENTRATING OXYGEN

[75] Inventors: William R. Mottram, Boulder; Gene A. Fisher, Lafayette; Louis Feierabend, Boulder, all of Colo.

[73] Assignee: Proto-Med. Inc., Boulder, Colo.

[21] Appl. No.: 647,857

[22] Filed: Sep. 4, 1984

Related U.S. Application Data

[63] Continuation of Ser. No. 465,479, Feb. 10, 1983, abandoned, which is a continuation-in-part of Ser. No. 402,270, Jul. 27, 1982, Pat. No. 4,502,873.

[51] Int. Cl.$^4$ .............................................. B01D 53/04
[52] U.S. Cl. ............................................ 55/68; 55/75; 55/163; 55/179; 55/389; 128/205.12; 128/205.27; 417/269; 137/855
[58] Field of Search ................... 55/21, 68, 75, 163, 55/179, 389, 25, 26, 58, 62; 417/269; 418/152, 236, 238; 128/205.11, 205.12, 205.24, 205.26, 205.27, 204.18; 137/843, 852, 855

[56] References Cited

U.S. PATENT DOCUMENTS

| | | | |
|---|---|---|---|
| 1,819,966 | 8/1931 | Olson | 417/269 |
| 2,616,615 | 11/1952 | Scott | 418/236 X |
| 2,944,627 | 7/1960 | Skarstrom | 55/62 X |
| 3,069,830 | 12/1962 | Skarstrom et al. | 55/62 X |
| 3,099,387 | 7/1963 | Beckfield | 418/238 X |
| 3,142,547 | 7/1964 | Marsh et al. | 55/26 |
| 3,176,444 | 4/1965 | Kiyonaga | 55/26 |
| 3,186,150 | 6/1965 | Zankey | 55/62 X |
| 3,187,993 | 6/1965 | Rhodes | 418/236 X |
| 3,193,190 | 7/1965 | Lindberg | 418/152 X |
| 3,237,377 | 3/1966 | Skarstrom | 55/25 |
| 3,242,650 | 3/1966 | Crawford | 55/62 X |
| 3,324,631 | 6/1967 | Kreuter | 55/163 |
| 3,338,030 | 8/1967 | Feldbauer, Jr. | 55/25 |
| 3,619,984 | 11/1971 | Domine et al. | 55/25 |
| 3,638,398 | 2/1972 | Domine et al. | 55/25 |
| 3,659,399 | 5/1972 | Kauer, Jr. et al. | 55/163 X |
| 3,778,967 | 12/1973 | Kauer, Jr. et al. | 55/21 |
| 3,807,444 | 4/1974 | Fortune | 137/855 X |
| 3,922,149 | 11/1975 | Ruder et al. | 55/21 |
| 4,086,923 | 5/1978 | Henkin | 128/205.11 |
| 4,137,018 | 1/1979 | Brucken | 418/238 X |
| 4,138,203 | 2/1979 | Slack | 417/269 |
| 4,194,891 | 3/1980 | Earls et al. | 55/179 X |
| 4,222,407 | 9/1980 | Ruschke et al. | 137/855 X |
| 4,222,750 | 9/1980 | Gauthier et al. | 55/68 X |
| 4,231,768 | 11/1980 | Seibert et al. | 55/179 |
| 4,272,265 | 6/1981 | Snyder | 55/179 X |
| 4,286,628 | 9/1981 | Paradis et al. | 137/843 |
| 4,302,224 | 11/1981 | McCombs et al. | 55/179 X |
| 4,331,455 | 5/1982 | Sato | 55/21 |
| 4,331,457 | 5/1982 | Morner | 55/163 |
| 4,349,357 | 9/1982 | Russell | 55/21 |
| 4,373,938 | 2/1983 | McCombs | 55/179 X |
| 4,378,982 | 4/1983 | McCombs | 55/179 X |
| 4,386,945 | 6/1983 | Gardner | 55/68 X |

Primary Examiner—Robert Spitzer
Attorney, Agent, or Firm—Young & Martin

[57] ABSTRACT

In addition to oxygen concentrator apparatus utilizing two zeolite beds and alternating, pressure controlled pressurization and exhaust cycles, with a swash plate cylindrical pump having a pressure sensitive idle mode, improved oxygen concentrator apparatus is also disclosed. The improved oxygen concentrator apparatus has an isothermal, high volume, low pressure air flow system with unrestricted air conducting lines and ports throughout for more efficient and effective oxygen production. It includes a unique rotary vane pump designed for essentially isothermal air pumping and has precision collet mounted rotor with centering apparatus, tapered vanes for reduced wear and erosion, and combination cast iron pump chamber liner with external aluminum finned casing to enhance both durability and heat dissipation. It also includes a combination double one-way and balancer valve for controlling the flow of oxygen-enriched air downstream from the zeolite beds.

21 Claims, 21 Drawing Figures

METHOD AND APPARATUS FOR CONCENTRATING OXYGEN

This application is a continuation of application Ser. No. 465,479, filed Feb. 10, 1983, now abandoned, which is a continuation-in-part of the copending patent application, Ser. No. 402,270, filed on July 27, 1982, now U.S. Pat. No. 4,502,873.

BACKGROUND OF THE INVENTION

This invention is related to producing oxygen gas suitable for human breathing, and more specifically to pressure swing adsorption air separation using selective molecular sieves.

It is known that some zeolitic materials have the characteristic of adsorbing nitrogen and oxygen from the air and that the selectivity of such zeolitic materials for nitrogen adsorption in relation to oxygen adsorption increases as pressure increases. Therefore, as air is injected under pressure into a zeolitic material, the zeolitic material adsorbs a greater proportion of nitrogen than oxygen. When the zeolitic material is packed in an elongated container, a stream of air injected under pressure into one end of the container is progressively stripped of a portion of its nitrogen content, which results in a proportionately higher oxygen content in the air stream toward the downstream end of the container. Therefore, the air in the downstream end of the container after it has passed through the zeolitic material under pressure is oxygen enriched.

As that flow of air through the zeolitic molecular sieve continues, the zone of increased nitrogen adsorption advances longitudinally through the length of the container toward the discharge end. When this zone or nitrogen front nears the discharge end, the effectiveness of the oxygen concentration near the discharge end diminishes. If the flow of air is continued long enough, the nitrogen front will replace the zone of oxygen enriched air at the discharge end of the container, and the effectiveness of the molecular sieve for producing oxygen will be virtually eliminated. However, by bleeding the pressure from the inlet or injection end of the container and allowing air to flow therethrough in the reverse direction, the zeolitic molecular sieve can be purged of the adsorbed nitrogen. The pressure drop resulting from bleeding and exhausting the inlet end causes the nitrogen adsorption selectivity of the zeolitic material to decrease and swing toward increased selectivity to oxygen adsorption. Consequently, the combination of bleeding pressure and reversing the flow of the air stream through the zeolitic material results in purging and exhausting the nitrogen from the container.

This selective nitrogen adsorption characteristic of zeolitic materials is used advantageously to produce oxygen for a variety of uses, including for breathing by persons, such as those with respiratory ailments, who benefit from breathing oxygen in higher concentration or purity than that naturally occurring in the air. However, in order to reach a useful oxygen purity level for breathing, it is necessary to increase the oxygen enrichment of the gas to a significantly greater extent than that achieved by one pressure and flow cycle.

The U.S. Pat. No. 4,194,891, issued to Earls et al, discloses a method and apparatus for "bootstrapping" the oxygen enrichment level of the gas through a plurality of cycles of pressurized air injection into the zeolitic material followed by bleeding off the pressure and reverse flow of air or gas through the zeolitic material. This "bootstrapping" effect is achieved by introducing a portion oxygen enriched air previously produced into the discharge end of the zeolitic material container during the bleeding and reverse flow phase of the cycle. Therefore, when the new cycle begins by injecting air under pressure into the inlet end of the container, there is a head start of increased oxygen concentration in the container. Consequently, the enriched oxygen concentration produced near the discharge end during the next phase of pressurizing and flowing air through the zeolitic material is enriched an increment greater than the preceeding cycle. This incremental increase in oxygen purity results from the oxygen added during the preceeding bleeding and purging phase.

The Earls et al Pat. No. 4,194,891 teaches the use of a plurality of containers of zeolitic molecular sieve material. The cycles in each container are not in phase with the other containers so that some oxygen enriched gas is always available from one container in the pressure and air injection phase to another container in the bleed and reverse flow path. The Earls et al patent teaches the addition of a portion of the oxygen enriched gas from one container to another container while the remaining portion is used for breathing or other useful purposes. With the repetition of these cycles over a period of time, including injection of oxygen enriched gas during bleeding and purging, each cycle achieves a higher oxygen purity level to a range of 88 to 98 percent oxygen.

While this "bootstrapping" process of repeated cycles and adding increasingly oxygen enriched gas to the purge phase of the cycles is effective to reach the level of an enriched oxygen gas suitable for breathing, some problems remain. For example, prior art methods and apparatus, such as that described in the Earls et at patent, have exceedingly complex flow circuits with numerous valves and timer control devices that must be set relative to such parameters as length of container, air injection rate, pressures and the like. They are also bulky and heavy and are quite efficient in energy consumption.

It has also been discovered that all of the prior art oxygen concentrators used for producing oxygen suitable for breathing by persons having respiratory problems are inefficient, excessive in size and weight, and excessively noisy in operation. These problems in prior art oxygen concentrators result from a misdirected, pressure oriented design concept that is common to the prior art oxygen concentrators. This misdirected design concept has resulted in part from a natural tendency to follow conventional adiabatic air compression systems as opposed to more unconventional isothermal gas flow concepts and, in part, to general unavailability of pneumatic system components conducive to isothermal air flow design concepts. The adiabatic compression systems of prior art oxygen concentrators suffer the disadvantages of excess heat inherently produced in adiabatic compression systems, excessive power requirements resulting in inefficient operation, and restricted air flow capacity resulting in lower oxygen product concentration per unit volume.

The inventors of this invention have found that the effectiveness of nitrogen adsorption in the zeolite bed decreases with increasing temperature of the air flowing into the zeolite bed. This decrease in effectiveness is a result of the zeolite's strong tendency to adsorb moisture, which reduces its ability to adsorb nitrogen. Hot air, of course, has a higher capacity to carry moisture than cold air. Therefore, hot air will not give up its moisture content to zeolite adsoprtion as easily as cold air. Consequently, hot air tends to carry the moisture farther into the zeolite bed than cold air, thus eventually decreasing the nitrogen adsorption capacity of the zeolite substantially throughout the entire zeolite bed. In contrast, if the in-take air is maintained at a lower temperature so that it has less capacity to carry moisture, the moisture in the in-take air will be stripped from the air almost immediately by the zeolite at the in-take end, thus leaving the zeolite in the remainder of the bed in a dry condition in which it retains a higher capacity to adsorb nitrogen. Further, when the moisture is concentrated in the zeolite close to the in-take end, it is more effectively and efficiently exhausted from the zeolite bed during the back flow or purging. Therefore, when the temperature of the air is kept low, less increase in pressure is required to achieve the desired oxygen production results.

It has also been found that by increasing the flow rate in isothermal conditions, the pressure gradient (i.e., change in pressure per unit of time) in the pressure swing cycle can be lowered and still attain the same oxygen production effectiveness of the zeolite bed, as well as increasing oxygen concentration purity in the resulting product. At the same time the purge phase of the cyle can occur at a faster negative pressure gradient, which increases the effectiveness of the oxygen concentration in the zeolite beds and increases product purity. Of course, increased volume of air flow through the sieve bed also results in an increased amount of oxygen product produced per unit of time. Therefore, achieving a higher pressure gradient, as opposed to high pressure, allows production of a desired oxygen purity concentration in the product through a lower total change in pressure or pressure swing, thus utilizing less power and resulting in greater effectiveness and product purity.

Consequently, the inventors have discovered that by redirecting the oxygen concentrator pneumatic air flow system to an isothermal, high volume, low pressure air flow system, as opposed to the adiabatic, high pressure and low volume air flow systems of the prior art oxygen concentrators, the combined benefits of lower temperature, decreased pressure gradient, and decreased power requirements result in a significantly increased efficiency and increased oxygen concentration capacity and purity in the end-usable product can be achieved than the prior art oxygen concentrators. They also found, however, that suitable system components necessary to achieve an isothermal, high volume and low pressure pneumatic air flow system were unavailable. They also found that conventional oxygen concentrator systems for use by persons with respiratory problems were unsuitably noisy and bulky so that they were somewhat unpleasant and annoying during use.

SUMMARY OF THE INVENTION

Accordingly, it is an object of this invention to provide a novel cycle control method and apparatus for pressure swing adsorption air separation process utilizing a plurality of zeolitic molecular sieves out of phase with each other that is relatively simple but effective.

It is also an object of this invention to provide pressure swing adsorption apparatus that is relatively light weight, easy to use, and energy efficient.

A still further object of this invention is to provide an oxygen concentrator having a unique air pump that has self-controlled upper pressure limit and idling functions to produce relatively high volume low pressure compressed air in intermittent cycles as required by the swing pressure adsorption oxygen concentration apparatus of this invention.

It is also an object of the present invention to provide an isothermal, low pressure and high volume pneumatic air flow system for oxygen concentrator apparatus.

A still further object of the present invention is to provide suitable system components for producing and maintaining substantially isothermal, low pressure/high volume air flow in oxygen concentrator apparatus.

Another object of the present invention is to provide a light weight, energy efficient, and highly effective oxygen concentrator that produces high volume, high purity oxygen and is convenient and pleasant for a person to use in supplying oxygen for breathing purposes.

The present invention includes a system for switching from a phase of pressurizing one zeolitic molecular sieve bed and bleeding the other bed to pressurizing the other bed and bleeding the one bed by pressure sensitive controls. A discharge line from each bed leads to a common chamber in which a pressure transducer is located. The pressure transducer causes a solenoid valve to switch phases when the chamber reaches a predetermined upper limit. A purge line also connects the discharge ends of each bed together, and a flow restrictor in the purge line controls the proportion of oxygen enriched gas allowed to flow into the bed being bled and purged.

The invention also includes a compressor drive having a swash plate biased by a compression spring to an acute angle to the drive shaft. The compressor piston rods of reciprocating piston compressors are connected to the swash plate, so increased pressure on the pistons causes the swash plate to move against the bias of the spring toward a right angle relation to the drive shaft.

A new embodiment of the oxygen concentration method and apparatus of this invention includes a substantially isothermal, high volume and low pressure pneumatic air flow system, including an air pump and control valve components that minimize or eliminate restrictions in the air flow sytem. It also includes a remote patient unit that allows use of oxygen produced in the concentrator apparatus by a person for breathing at a remote location from the oxygen concentrator apparatus.

BRIEF DESCRIPTION OF THE DRAWINGS

Other objects, advantages, and capabilities of the present invention will become more apparent as the description proceeds, taken in conjunction with the following drawings, in which.

DESCRIPTION OF THE PREFERRED EMBODIMENT

The oxygen concentrator apparatus 10 of the present invention is comprised essentially of compressor apparatus 70 for compressing air, two sets of zeolite molecular sieves for separating oxygen from air, a valve 100 and pressure control and balancing components for effecting oxygen concentration in the zeolite containers, and flow control components for using the oxygen enriched concentrated gas.

Figures 1, 2:
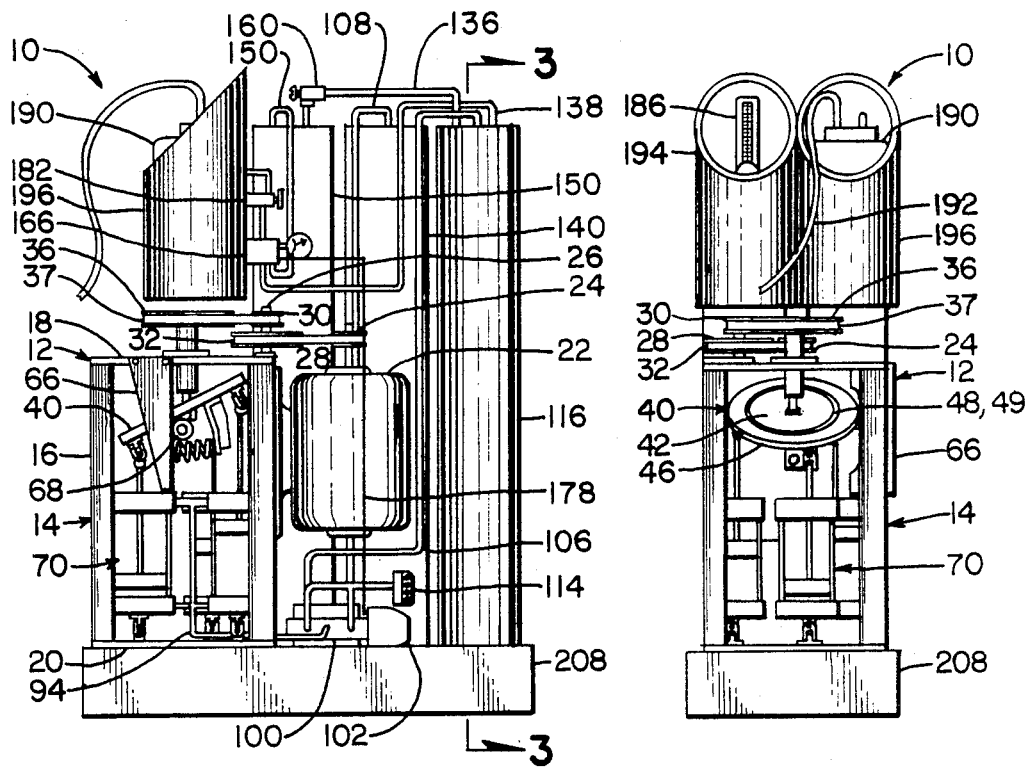
FIG. 1 is a side elevation view of the oxygen concentrator apparatus of the present invention.
FIG. 2 is a front elevation view of the oxygen concentrator apparatus of the present invention.
Figures 3, 5:
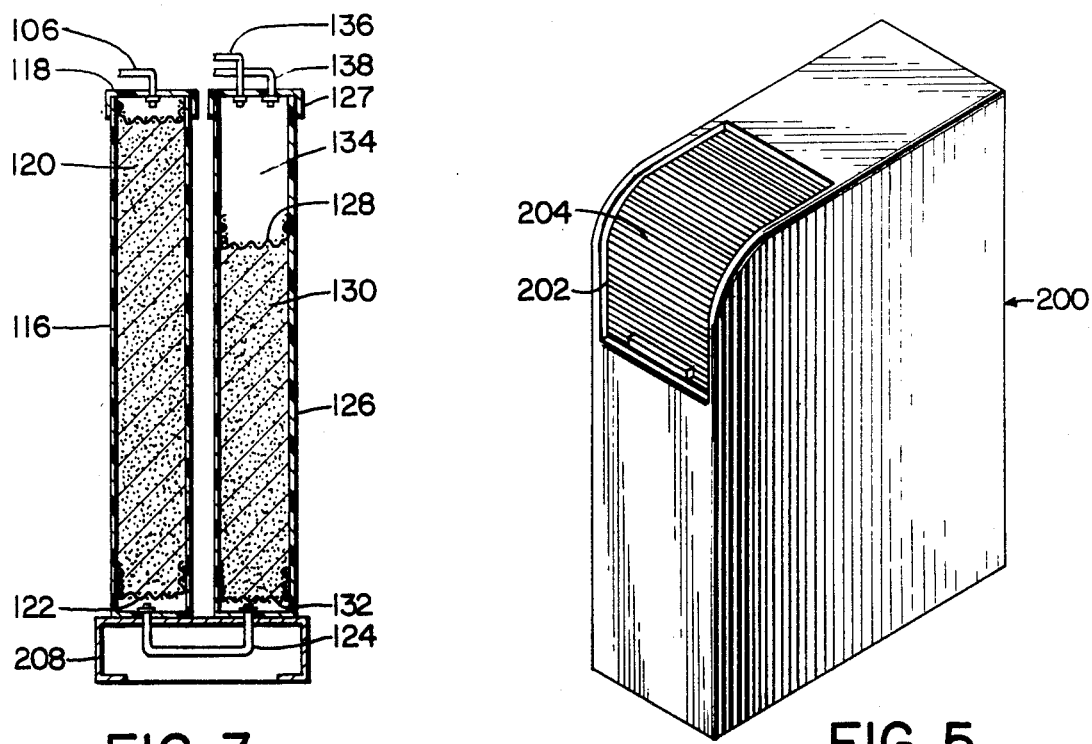
FIG. 3 is a cross sectional view of the zeolite containers taken along lines 3—3 of FIG. 1.
FIG. 5 is a perspective view of a decorative cabinet/cover for the oxygen concentrator of the present invention.
Figure 6:
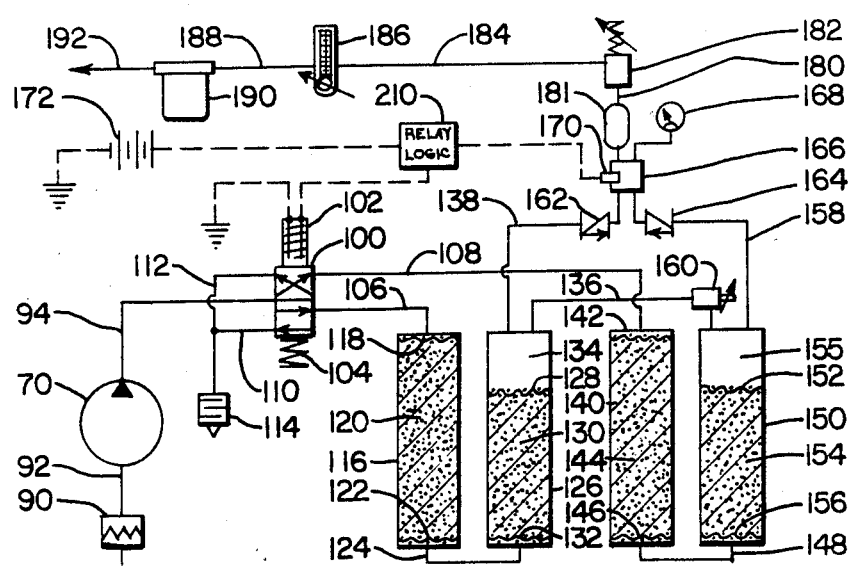
FIG. 6 is a schematic flow diagram of the oxygen concentrator of the present invention.

Referring now primarily to FIG. 6 in combination with FIGS. 1, 2 and 3, two pairs of zeolite molecular sieves are provided for producing oxygen enriched gas. Cylindrical containers 116, 126 are tied together to function as one molecular sieve unit in the cyclic portion of the "bootstrapping" pressure swing adsorption oxygen concentration process, and cylindrical containers 140, 150 are tied together to function as a second molecular sieve unit. These containers 116, 126, 140, 150 are positioned in an upright orientation on the base 208.

A tube 124 extends from the bottom of container 116 to the bottom of container 126 to put these two containers 116, 126 in fluid flow relation to each other. The interior of container 116 is packed with a zeolitic molecular sieve material 120 between a bottom screen 122 and top screen 118. A cap 117 encloses the end of container 116, and a gas flow line 106 extends through cap 117 to inject gas into and bleed gas from the interior of container 116. Container 126 is also packed with a quantity of zeolitic molecular sieve material 130 between a bottom screen 132 and top screen 128. However, the top screen 128 is positioned a spaced distance below the cap 127 to leave a reservoir space 134 at the top of container 126. Flow lines 136 and 138 extend through the cap 127 to inject gas into and bleed gas from the interior of container 126.

The second pair of containers 140, 150 are structured basically the same as containers 116, 126. Container 140 is packed with a zeolitic molecular sieve material 144 between a top screen 142 and bottom screen 146, and container 150 is packed with a zeolitic molecular sieve material 154 between top sieve 152 and bottom sieve 156. The bottom screen 152 is a spaced distance downwardly from the top of container 150 to leave a reservoir 155 therein for accumulating concentrated oxygen enriched gas. A tube 148 extending from the bottom of container 140 to the bottom of container 150 connects containers 140, 150 in fluid flow relation to each other.

The compressor assembly 70 draws ambient air through an inlet filter 90 and suction line 92, compresses the air, and directs it under pressure to either container 116 or container 140. The solenoid actuated four way valve 100 in line 94 directs the compressed air in line 94 to line 106 for injection into container 116 and alternately through line 108 for injection into container 140. As the valve 100 connects line 94 with line 106, it simultaneously connects line 108 with exhaust line 112 for bleeding or exhausting gas from container 140. Likewise, when valve 100 connects line 94 with line 108 to pressurize container 140, line 106 is connected simultaneously with exhaust line 110 to bleed pressure from container 116. The exhaust lines 110, 112 discharge the exhaust gas through a muffler 114.

Actuation of the solenoid 102 is effective to shift valve 100 to direct compressed air from line 94 through line 106 to pressurize container 116 and to bleed the pressure from container 140. Deactivation of solenoid 102 allows spring 104 to shift valve 100 back to the position wherein pressurized gas from line 94 is directed through line 108 to container 140 while pressure is bled from container 116. Solenoid valve 102 is powered by any convenient or appropriate electric power source represented as a battery 172 in FIG. 6, but which could be a transformer (not shown), or the like. Relay logic 210 responsive to pressure in a chamber 166 controls electrical actuation and deactuation of solenoid 102 to cycle the pressure swing adsorption oxygen concentration process, as will be described in more detail below.

Oxygen can be concentrated at one end of a zeolite material container by "bootstraping" incremental additional amounts of oxygen in that area through repetitious cycling from a phase of high pressure flow of air in one direction through the container and a phase of low pressure in a reverse flow or countercurrent. One of the unique features of this invention includes an apparatus and method utilized to balance and control the phase changes in the cycle from one pair of containers 116, 126 to the other pair of containers 140, 150 for optimum oxygen enrichment of the air and efficient use of energy. This apparatus and method is pressure sensitive and is not oriented to time or container size are a function of pressure build up and bleeding. As pressurized air is directed through line 106 to the top of container 116, pressure begins to build in the top end of container 116. Line 124 connects the bottom of container 116 to the bottom of container 126 so that pressure also begins to build in the bottom of container 126. As the pressure in containers 116, 126 increases, the zeolitic material 120, 130 adsorbs incrementally larger proportions of nitrogen than oxygen. Therefore, an incrementally larger proportion of oxygen from the air flowing therethrough is allowed to gather in the upper end of the zeolite 130 and in the reservoir 134 of container 126. Some of this oxygen enriched air then flows out of container 126 through line 136 and through line 138. A flow restrictor 160 in line 136 allows only a portion of the oxygen enriched air from the top of container 126 to flow and into the upper end of container 150. The remaining proportion of the flow of oxygen enriched air from container 126 flows through line 138 and through one way check valve 162 into the pressure chamber 166. From pressure chamber 166, that portion of oxygen enriched air continues to flow through line 180 and accumulator or surge tank 181, and through lines 184, 188, and 192 to the point of use. The point of use of the oxygen enriched air is typically a canula (not shown) adapted for insertion into a person's nose for breathing the oxygen enriched air.

A pressure regulator 182 is positioned in line 184 to hold a back pressure in chamber 166 and to allow discharge of oxygen in a pre-selected maximum pressure threshhold appropriate for its use, such as approximately 4 p.s.i. for a canula. Therefore, to the extent that the oxygen from the upper end of container 126 is not released for use through pressure regulator 182 or flow restrictor 160 to container 150, pressure is built up in pressure chamber 166. A one way check valve 164 in line 158 prevents back flow of the oxygen from pressure chamber 166 into container 150.

When the pressure in chamber 166 reaches a predetermined optimum threshhold, such as 12 to 15 p.s.i., the relay logic 210 actuates solenoid 102 to shift valve 100. Upon shifting valve 100 to the alternate position the pressurized air from line 94 is rerouted through line 108 to the upper end of container 140. Simultaneously, the pressure previously built up in containers 116, 126 immediately begins to bleed through line 106 to exhaust into the atmosphere through muffler 114. As pressure in containers 116, 126 decreases, the nitrogen selectivity of the zeolitic material 120, 130 therein decreases. Therefore, the nitrogen adsorbed by the zeolite material 120, 130 is released or desorbed and is exhausted through lines 106 to the atmosphere.

During this bleed phase of containers 116, 126, the pressure drop in containers 116, 126 causes the zeolitic material 120, 130 to adsorb additional increments in proportion of oxygen. At the same time, container 140 is being pressurized by air through line 108. As the pressure in containers 140, 150 increases, increasingly larger proportions of nitrogen is adsorbed by the zeolitic material therein leaving an enriched oxygen gas at the upper end of container 150 and in the reservoir area 155. A restricted portion of that oxygen enriched gas from reservoir 155 flows through the flow restrictor 160 and through line 136 to the upper end of container 126. This flow of oxygen enriched gas into the upper end of container 126 adds to the oxygen adsorbed by the zeolitic material 130 under low pressure. This additional enrichment of oxygen enriched gas provides the "bootstrapping" effect for building the proportion of oxygen in the gas therein to higher levels of oxygen purity. The remaining proportion of oxygen enriched gas flows from container 150 flows through line 158 and one way check valve 164 into the pressure chamber 166. The check valve 162 in line 138 prevents the back flow of gas from chamber 166 into container 126. Of course, the oxygen enriched gas from chamber 166 flows as described above through lines 180, 184, 188, 192 to the point of use.

Upon reaching the threshold of about 12 to 15 p.s.i. in chamber 166 in this cycle, the electronic relay logic circuit 210 again energizes solenoid 102 to shift valve 100 for reversing this phase of the cycle to again pressurize containers 116, 126 and bleed the pressure from containers 140, 150. In this new cycle, nitrogen is again adsorbed by the zeolitic material allowing an enriched oxygen proportion to flow to the reservoir 134 at the top of container 126, which is added to the already enriched oxygen concentration therein. Again, a proportion of this additionally oxygen enriched gas flows through line 136 and flow restrictor 160 to the upper end of container 150 to enrich the oxygen concentration therein, while the remainder of the flow is directed through line 138 to pressure chamber 166 and to the ultimate use point at the end of line 192. The flow restrictor 160 is adjustable to accommodate fine tuning the cycle to produce an optimum volume of enriched oxygen of the desired purity level for use.

The relay logic 210 can be wired in any of a number of state of-the-art configurations for shifting the valve 100 from a first position to a second position when pressure in pressure chamber 166 reaches the threshhold 12 to 15 p.s.i. from container 126 and for shifting the valve 100 back to the first position again when pressure in pressure chamber 166 reaches 12 to 15 p.s.i. from container 150. One example of appropriate logic is to utilize a pressure transducer 170 in chamber 166 that varies voltage output in direct proportion to pressure in the chamber 166. This variable voltage output from the transducer 170 is then amplified and compared to a fixed voltage from a zener diode. When the transducer voltage is greater than the reference voltage, a diode in a comparator fires a voltage pulse. The pulses go through a divide by two system so the first pulse charges to up state to energize the solenoid 102, and the second pulse reverts to down state to de-energize the relay. The significant feature herein is to effect automatic cycling in response to an optimum pressure threshhold.

A flow rate measuring device and adjustable rate valve 186 is positioned in line 184 to allow the user to adjust the rate of oxygen flow to the desired level. Also, a humidifier 190 is positioned in line 188 to add moisture to the flow of oxygen to decrease the irritating effect of dry oxygen in the membranes of a person's nose. The humidifier is basically a water container through which the oxygen enriched gas is bubbled before it is delivered to the canula.

Figure 4:
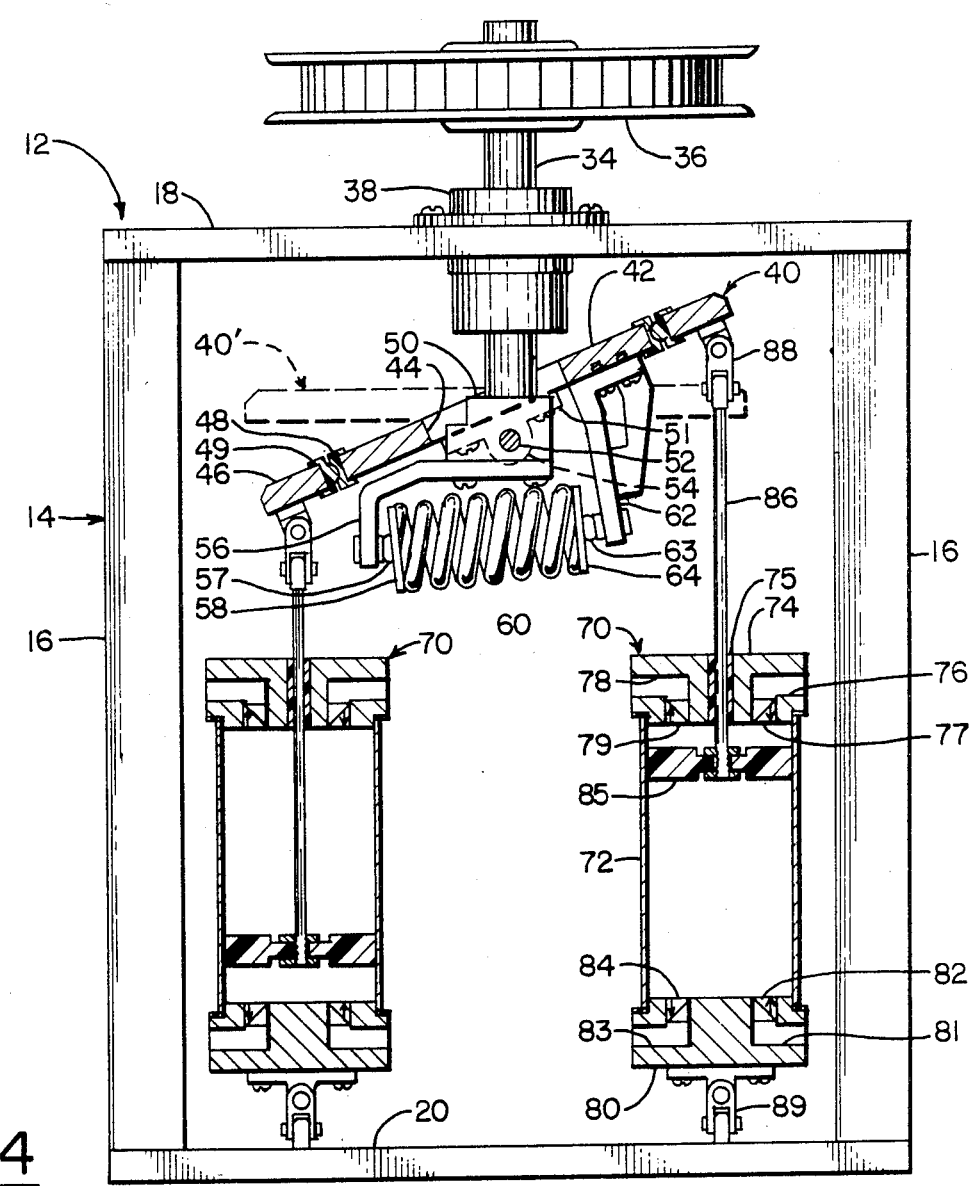
FIG. 4 is an enlarged elevation view, partially in section, of the compressor apparatus of the present invention.

Another unique feature of this invention is the compressor assembly 12, as best seen in FIG. 4. It includes a frame 14 comprised of a plurality of upright columns 16 attaching together in spaced-apart relation to each other an upper plate 18 and lower plate 20. A plurality of reciprocating piston type air compressors 70 are positioned in the frame 14 and attached by universal joints 89 to the bottom plate 20. Each compressor is structured in a state of the art manner having an elongated cylindrical chamber 72 with a piston 85 slidably positioned therein. A piston rod 86 extends upwardly from the piston 85 through a bushing 75 in upper cylinder head 74. The upper cylinder head 74 is positioned on and seals the upper end of cylinder 72 and includes an intake duct 76 and discharge duct 78 therethrough. A check valve 77 positioned in intake duct 76 allows air to flow into the cylinder 72 through intake duct 76 but prohibits a reverse flow of air outwardly through duct 76. Another check valve 79 positioned in discharge duct 78 allows air to flow out of the cylinder 72 through duct 78, but prohibits the air from flowing through duct 78 into the cylinder 72.

Likewise, a bottom cylinder head 80 is positioned on and seals the lower end of cylinder 72. It includes an inlet duct 81 with a check valve 82 for allowing air to flow into cylinder 72, and it includes a discharge duct 83 with a check valve 84 positioned therein to allow air to flow only outwardly through duct 83. Therefore, as the piston 85 reciprocates upwardly and downwardly in cylinder 72, ambient air is drawn in through inlet ports 76, 81 where it is compressed in cylinder 72 and discharged under pressure through discharge ports 78, 83.

The piston drive assembly for reciprocating the pistons 85 of compressor 70 upwardly and downwardly is comprised of a variable angle swash plate 40. The swash plate 40 is comprised of an inner circular ring portion 42 and an outer circular ring portion 46. The outer ring portion 46 is positioned concentrically around the peripheral surface of the inner ring 42 and is slidably retained in that position by a pair of nylon or teflon bearings interfaced together to allow the inner ring 42 to rotate in relation to the outer ring 40 with a minimum of friction. The inner ring 42 is intended to rotate with main shaft 34, while the outer concentric ring 46 is prevented from rotating by a guide wheel 68 bearing against a stationary guide plate 66 (shown in FIG. 1).

The inner concentric ring 42 has a center hole 44 therein which allows protrusion therethrough of the main shaft 44 and hub 50. Hub 50 is fastened to main shaft 34 by set screw 51 so that it rotates with main shaft 34. Main shaft 34 is rotated by pulley 36 and is journaled in the upper plate 18 by a bearing block 38.

The hub 50 has a pivot pin 52 extending transversely therethrough in such a manner that it protrudes outwardly from diametrically opposite lateral sides of hub 50. The ends of the pivot pin 52 extend into a pair of pivotal mounting brackets 54, which are fastened to the inner concentric ring 42 of swash plate 40. For clarity of illustration, only one of these pivotal mounting brackets 54 is shown in broken lines positioned behind the hub 50. The other pivotal mounting bracket 54, which has been removed in the drawing by cutting the cross section through swash plate 40 for illustration, is normally positioned on the pivot pin 52 in front of the hub 50. Therefore, the inner concentric ring 42 rotates with main shaft 34, but it is also pivotal about the axis of pin 52 in relation to main shaft 34.

When the swash plate 40 is positioned at an acute angle to the axis of main shaft 34, rotation of the inner concentric ring 42 in relation to the stationary outer concentric ring 46 causes the outer concentric ring 46 to rock upwardly and downwardly in relation to the compressors 70. The upper ends of the piston rods 86 are attached by universal joints 88 to the outer concentric ring 46 in spaced-apart relation to each other. Therefore, the rocking motion of the outer concentric ring 46 in relation to the compressor 70 drives the piston rods 86 upwardly and downwardly. Of course, the upward and downward motion of piston rod 86 and piston 85 is operative to compress air in the cylinder 72 as described above.

Any desired number of compressors 70 can be positioned under the swash plate 40 and driven thereby as space allows. Two of such compressors 70 are shown in FIG. 4, and the preferred embodiment shown in FIGS. 1 and 2 illustrate three compressors positioned under the swash plate 40.

A unique feature of this invention is the pressure control feature of the swash plate compressor drive system illustrated in FIG. 4. This pressure control system includes a compression spring 60 mounted between brackets 56, 62. Mounting bracket 56 is rigidly attached to the bottom surface of hub 50, and the opposite mounting bracket 62 is rigidly attached to the bottom surface of inner concentric ring 42. The compression spring 60 is retained in this position by a pair of keepers 58, 64 on opposite ends thereof which are retained between brackets 56, 62 by bell connectors 57, 63, respectively.

The axially outward force exerted by spring 60 on bracket 62 biases the swash plate 40 to an accute angle with the main shaft 34. The swash plate 40 maintains this attitude as long as there is minimal force exerted on the swash plate 40 by the piston rods 86 of compressor 70. However, as pressure in the cylinders 72 of compressor 70 increase, increasingly large forces are required to reciprocate the pistons 85. Therefore, as the pressure in the cylinder 72 increases, the piston rods 86 exert increasingly large vertical forces on the outer concentric ring 46. As these forces increase sufficiently to overcome the axially outward force exerted by spring 60 on bracket 62, the spring 60 begins to yield and the swash plate 40 pivots about pin 52 to decrease the angle between swash plate 40 and main shaft 34. Theoretically, if the compressors 70 are spaced equally around the perimeter of the swash plate 40, and as the pressure therein increases to a sufficient extent, the spring 60 will compress a sufficient amount to allow the swash plate 40 to be rotated to a right angle in relation to shaft 34 as shown by broken lines 40'. In this right angle position, the inner concentric ring 42 merely rotates within the outer concentric ring 40 with no concurrent rocking motion, and the compressors 70 are essentially in a non-reciprocating idle mode.

The advantages of this compressor drive system are several. First, as the pressure in the oxygen concentrator system builds up to the 12 to 15 p.s.i. maximum threshhold, the length of the reciprocating strokes of the pistons 85 in compressor 70 decrease proportionally so that the volume of air compressed and pumped into the system is only that required to operate the system and meet the user flow rate as set by the rate indicator and valve assembly 186. Further, rather than requiring increased horsepower and energy consumption near the upper pressure peak of the cycle, the compressor 70 actually goes into an idle mode or a near idle mode so that the power requirements at high pressure are actually decreased.

The maximum pressure capabilities of the compressors 12 can be set by the strength of the compression spring 60 utilized in the assembly. If higher pressures are necessary, a stiffer spring 60 can be utilized. On the other hand, if lower upper pressure limits are desired, weaker springs 60 can be positioned in the assembly. This feature also provides an upper pressure limit on the system so that if one of the other components misfunctions to interrupt the normal cycling of the system, excess pressure will not build up in the system to damage lines or components. The pressure would only build up to the extent allowed by the strength of the spring 60, at which point the swash plate 40 would move toward the right angle position 40' so that the compressor 70 would be in an idle mode with little or no reciprocation of pistons 85 therein.

The compressor assembly is driven by a motor 22 mounted on one side of the frame 14. A counter shaft 26 is mounted on one corner of the frame 12 and has a large pulley 28 driven by a small motor pulley 24 and a small pulley 30 which drives a larger main pulley 37 in order to reduce the speed to the proper gear ratio desired. The position of counter shaft 26 is adjustable so that it can also function as a belt tightener.

An asthetically pleasing cabinet or cover 200 as shown in FIG. 5 is provided to enclose the oxygen concentrator assembly 10 of the present invention. It includes an opening 202 with a slidable door 204 adjacent the mounting structures 194, 196 wherein the flow rate indicator and adjustment valve 186 and humidifier 190 are positioned. Therefore, the opening 202 provides ready access to the humidifier and the flow control and indicator assembly.

Figure 7:
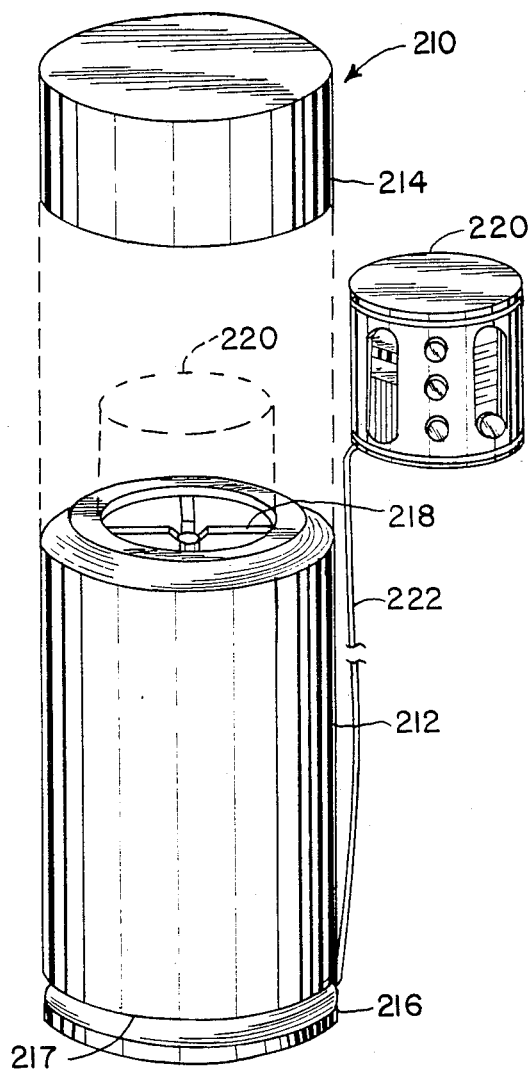
FIG. 7 is a perspective view of the improved embodiment of the oxygen concentrator of the present invention showing the cylindrical enclosure with the remote patient unit connected thereto and showing in broken lines the position of the remote patient unit when stored in the enclosure.
Figure 8:
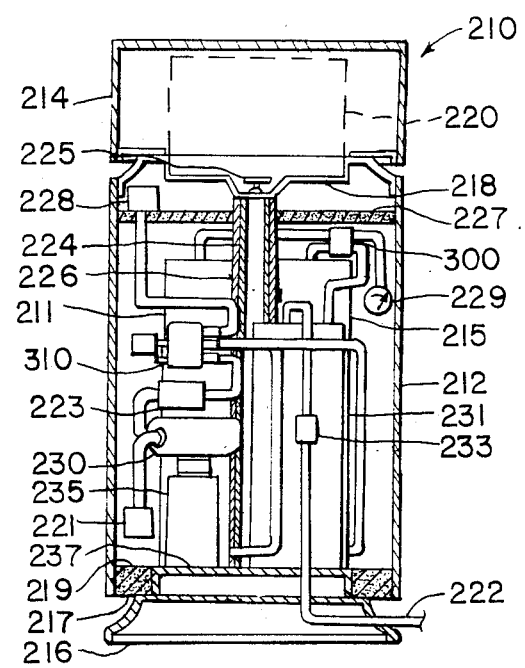
FIG. 8 is a cross sectional view of the improved oxygen concentrator apparatus shown in FIG. 7.
Figure 9:
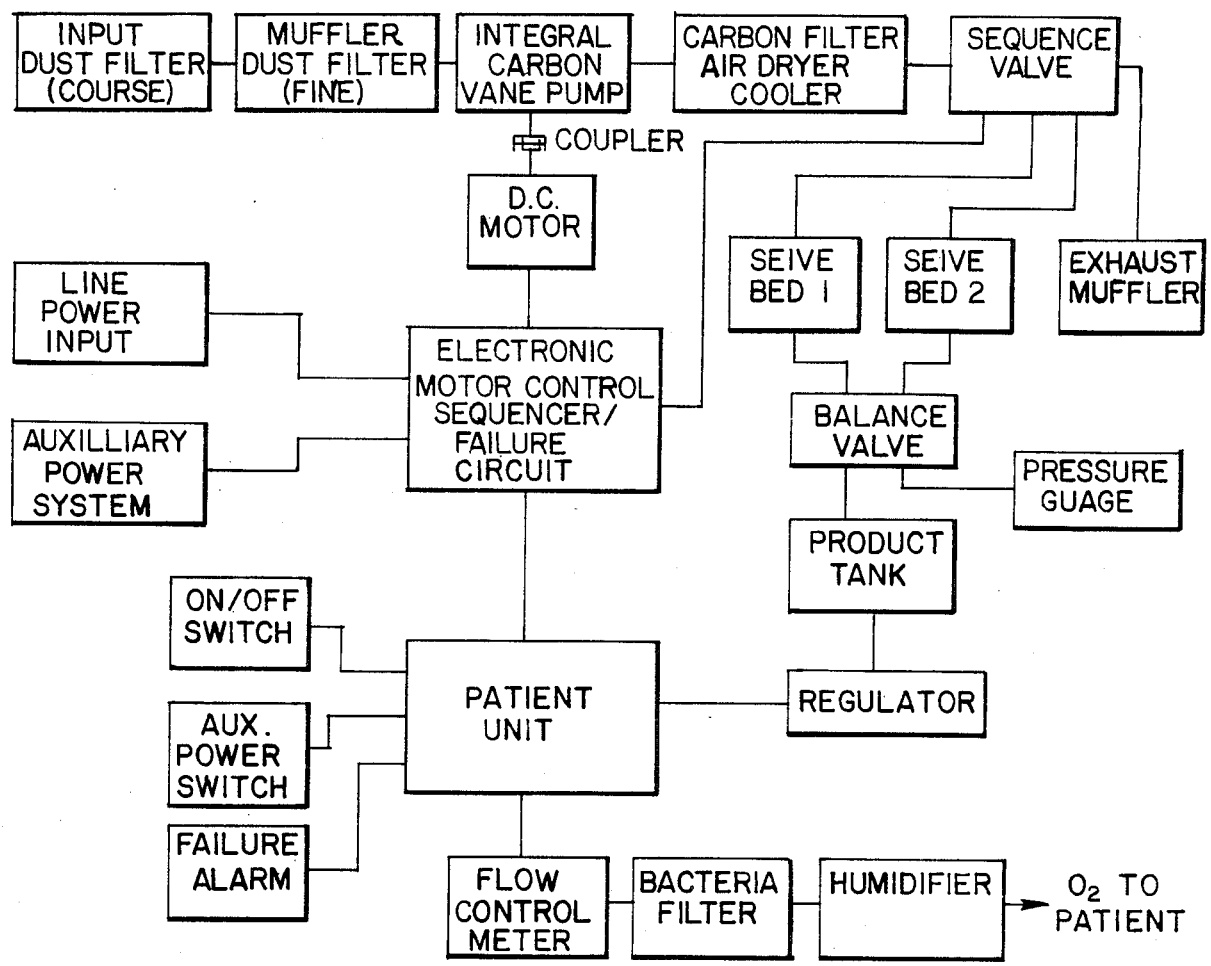
FIG. 9 is a block schematic diagram of the system components of the improved oxygen concentrator.

An improved embodiment of the oxygen concentrator of the present invention is shown in FIGS. 7 and 8, and the block schematic diagram for the improved oxygen concentrator is shown in FIG. 9. This improved oxygen concentrator is designed to utilize a low pressure, high volume, isothermal air flow concept that increases the efficiency and effectiveness of oxygen concentration and results in a higher volume and purity level with less energy and smaller, lighter components than other oxygen concentrator systems.

The improved oxygen concentrator unit 210 as shown in FIGS. 7 and 8 is comprised of a cylindrical enclosure 212 with a removable cover 214 and a removable remote patient unit 220. A recessed shelf arrangement 218 is positioned near the top of the enclosure 212 to support the remote patient unit 220 when it is positioned on the shelf 218 for storage or shipment position as indicated by the broken lines 220'. The remote patient unit 220 is connected to the components of the oxygen concentrator system in the enclosure 212 by a umbilical cord 222. The enclosure 212 is positioned on a support base 216, and an annual air intake slot 217 opens into the enclosure 212 between the enclosure 212 and the base 216. A component platform 237 is positioned on base 216 for holding the components of the system. A vertical tube column 224 extends upwardly from the platform 215 to the top portion of the unit, where the shelf brackets 218 are attached thereto by screw 225. Ready access to the system components inside the enclosure 212 for inspection maintenance and repair is attained by simply removing the screw 225 and lifting the entire enclosure 212 upwardly to remove it from the unit.

One of the disadvantages of oxygen concentrators prior to this invention has been that they are quite noisy in operation and can be annoying to the person or patient using the oxygen supplied by the oxygen concentrator. The design of this oxygen concentrator unit, as shown in FIGS. 7 and 8, is that the oxygen concentrating components of the apparatus housed in the enclosure 212 can be located at some remote distance from the patient, and the basic required controls and monitoring equipment included in the patient unit 220 can be positioned near the patient. Therefore, the patient can have access to all of the flow control valves and monitoring equipment, including the cannula for delivering the concentrated oxygen, while the operating components of the oxygen concentrator unit are located at some remote distance from the patient, such as in another room, in the basement, and the like. Alternatively, the patient unit 220 can be positioned in the enclosure 212 under the cover 214 as shown in FIGS. 7 and 8 by the broken lines 212' for storage or use.

The basic design concept improvement in this improved oxygen concentrator 210 is that it has an air flow circuit that is essentially isothermal in nature, as opposed to adiabatic in nature, to keep the temperature of the air at a minimum while flowing relatively large quantities of air at a relatively low pressure. In order to achieve this objective, it has been necessary to design component parts of the air flow system in such a manner that there are no restrictions to air flow in any of the components. Until the development of this improved oxygen concentrator invention, such components as a long lasting rotary vane pump for pumping a relatively high column of air at low pressure, a sequence four-way valve having no restrictions to flow therethrough, and a simple flow control and balancer valve having long lasting reliable yet simple operating components were not available to use in this application. Such components were particularly unavailable with low energy consumption characteristics and lightweight, which are essential to an effective oxygen concentrator design that is lightweight and easy for a relatively unhealthy patient to handle and which is effecient and cost effective in operation, since it must operate usually around the clock for months and years on end.

Referring now to FIGS. 8 and 9, air can be drawn into the interior of the enclosure 212 through the intake opening 217. An annular dust filter 219 is positioned over the intake opening 217 to filter larger dust particles and debris from the inflowing air. Air is drawn into the oxygen concentrator system through an intake muffler and fine dust filter component 221. The air is drawn into the system by a unique rotary vane air pump 230, which is driven by a DC electric motor 235. The air pump 230 produces a high volume low pressure stream of air that is directed into a combination carbon filter/air dryer 223, which it can also include air cooler features if necessary. Generally speaking, in the isothermal air flow system of this oxygen concentrator apparatus significant cooling capacity is not required. Therefore, large, relatively heavy cooling components are not required in this system. Therefore, the primary function of this carbon filter/air cooler is to remove any carbon dust in the air stream created by the graphite vanes in the rotary pump 230. The amount of such graphite dust is minute; however, since the oxygen produced is intended for direct human consumption, it is necessary to remove any such particles.

After leaving the carbon filter/air dryer 223, the stream of air is directed into a sequence valve 310, which controls the sequence of alternate charging and purging of the two sieve beds 211, 215. It is important to the isothermal air flow design concept of this improved oxygen concentrator that this sequence valve 310 not have any restrictions to air flow therethrough, and it is preferable that it is lightweight and operates on a minimum of power. Such a valve, which is uniquely adapted to meet these requirements is disclosed and described in the co-pending patent application entitled Four Way Pneumatic Valve invented by Gene A. Fisher and Hans R. Bucher, Ser. No. 465,478 filed Feb. 10, 1983. This sequencer valve 310 is essentially a four way pneumatic valve having virtually no flow restrictions therethrough, which is effective to direct air from the pump 230 to sieve bed 211 while exhausting sieve bed 215 to the atmosphere, and alternately directing the air stream into sieve bed 215 while exhausting sieve bed 211 to the atmosphere. The exhaust muffler 228 of this embodiment is shown positioned in the upper portion of the enclosure 212 above a filter 227 or other appropriate barrier effective to prevent the exhausted nitrogen enriched air from being drawn into the intake muffler 221 for recycling. It is preferred that air drawn into the system be fresh air drawn through filter 219 in intake opening 217 in order to avoid utilizing oxygen lean air in the system.

The actual air pressurization and alternate purging of the sieve beds 211, 215 in sequential relation while "bootstrapping" the oxygen concentration by enriching the outlet end of the zeolite sieve beds is similar to that described in the first embodiment of this invention, with the already noted exception that this improved system operates at a higher volume and lower pressure, essentially isothermal manner, which significantly increases the efficiency of the oxygen concentration operation, as well as the ultimate oxygen concentration ratio in the product delivered to the patient.

In order to enhance the isothermal character of this air flow system, as well as to simplify and maintain the enriching balance flow, a combination control and balance valve 300 has been devised which also is characterized by full opening ports with no restrictions therethrough and simple, efficient, long lasting operating components necessary for reliable operation of an oxygen concentrator unit, particularly in life support usage. This combination control and balance valve 300 incorporates the essential features of the one way check valves 162, 164 and balance valve 160 of the first embodiment of this invention into one lightweight, efficient and reliably operating valve. A pressure gauge 229 is connected to the down stream side of the combination control and balance valve 300 for setting and monitoring pressure at this point, and the oxygen enriched air flow from the valve 300 is directed into the product tank 231 for storage. From the product tank 231, the enriched oxygen is directed through a pressure regulator 233 and then through the umbilical cord 222 to the remote patient unit 220. The remote patient unit includes an on/off switch, auxiliary power switch, and system failure alarm for convenient use of the patient. It also includes a flow control meter, a bacteria filter, and a humidifier in the enriched oxygen flow line to regulate the volume of flow, and clean any bacteria from the oxygen flow and humidify it just prior to delivering it to the patient through a cannula (not shown).

Figure 17:
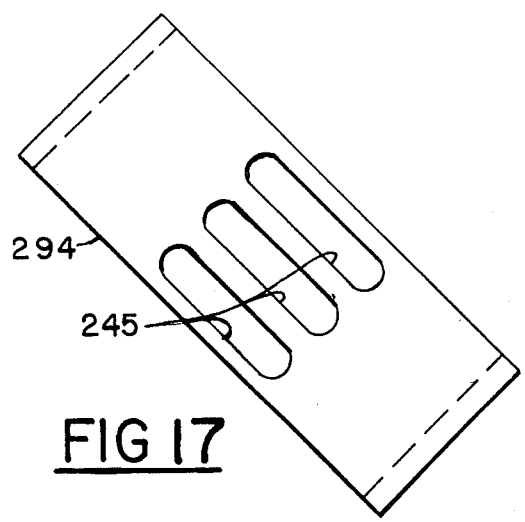
FIG. 17 is a plan view of the liner looking down at the exhaust port section.
Figures 10, 11:
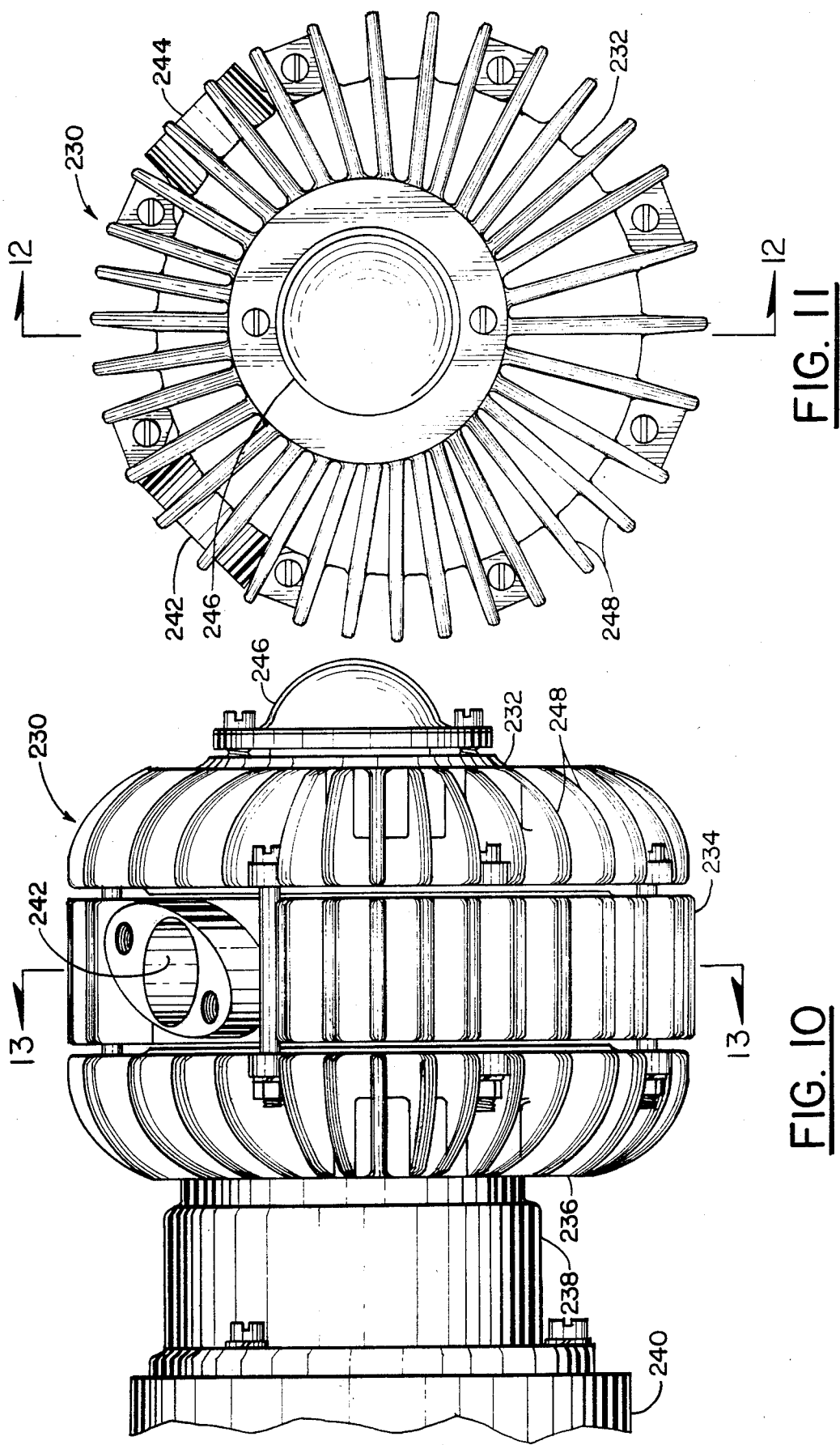
FIG. 10 is a side elevation view of the improved air pump utilized in the system of the improved oxygen concentrator of this invention.
FIG. 11 is a front elevation view of the air pump.

The air pump 230 and its operating components are shown in more detail in FIGS. 10 and 17. Significant features of this air pump include a composite construction of an aluminum housing for efficient heat radiation in combination with a cast iron liner around the compressor chamber for high wear characteristics, tapered pump vanes for eliminating graphite wear to enhance the use of the pumped air in life support systems where pure air or oxygen is essential, the accurate, low tolerance rotor mounting, and the large exhaust orifice, all of which are directed to enhance to the extent possible low pressure, high volume isothermal air flow. The structure of these significant features will be described more fully herein along with a complete description of the pump structure.

Referring to FIGS. 10 and 11, the pump 230 is comprised of a mid-section casing 234 sandwiched between two end casings 232, 236. For purposes of description, the end of the pump 230 near the motor 240 will be referred to as the rear end, and the opposite end will be referred to as the front end. Therefore, end casing 232 will be referred to as the front end casing, and end casing 236 will be referrred to as the rear end casing. The rear end casing 236 is connected to an electric motor 240 by a cylindrical cuplar housing 238. A dust cap 246 or similar protective device is attached to the front end casing 232 to protect the internal components from dust and other contamination. The intake port 242 and exhaust port 244 extend through the mid-section casing 234 from the exterior to the interior pump chamber, and a plurality of fins 248 are molded into the front, rear and mid-section casings to enhance radiation and dissipation of heat from the casings. As mentioned above, these casings are preferably fabricated of a light weight, high heat dissipating material such as aluminum.

As best seen in FIGS. 12, 13, 16, and 17, the interior pump chamber in the mid-section casing 234 is lined with a cylindrical liner sleeve 294, preferably fabricated of cast iron. The sides of the pump chamber 251 are enclosed by a front container housing 292 and a rear container housing 290. These container housings 290, 292 are positioned in and retained in place by the respective rear and front aluminum end casings 236, 232. Like the cylindrical liner 294, these container housings 290, 292 are preferably fabricated of cast iron.

Figure 14:
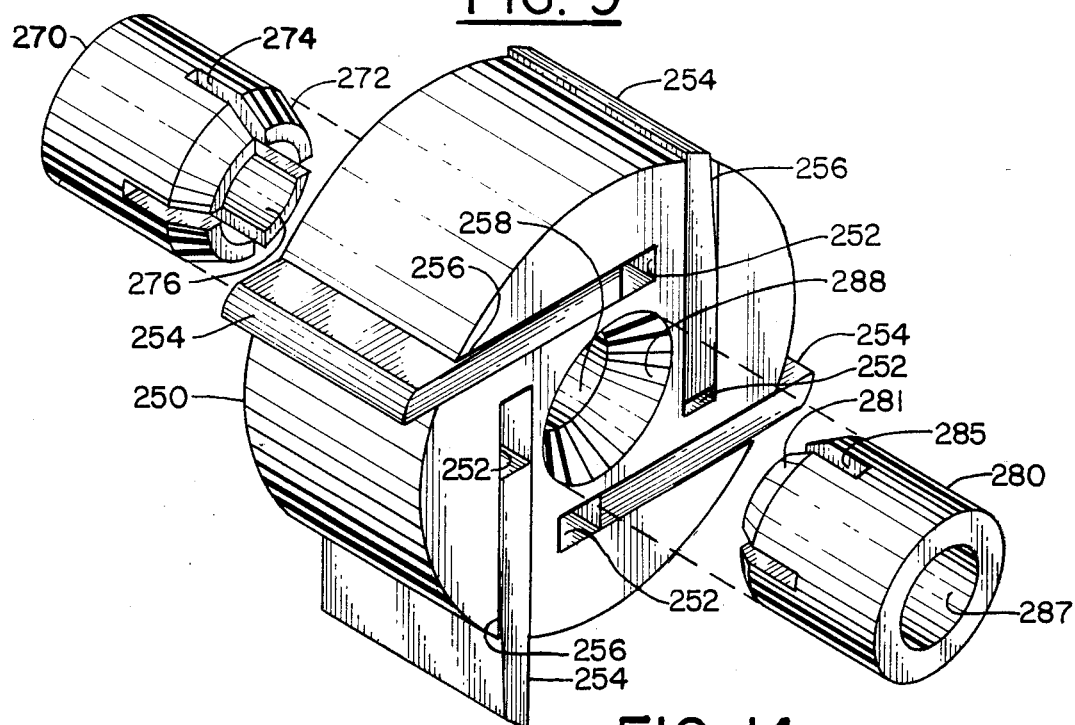
FIG. 14 is a perspective partially exploded view of the pump rotor and mounting collet.
Figure 13:
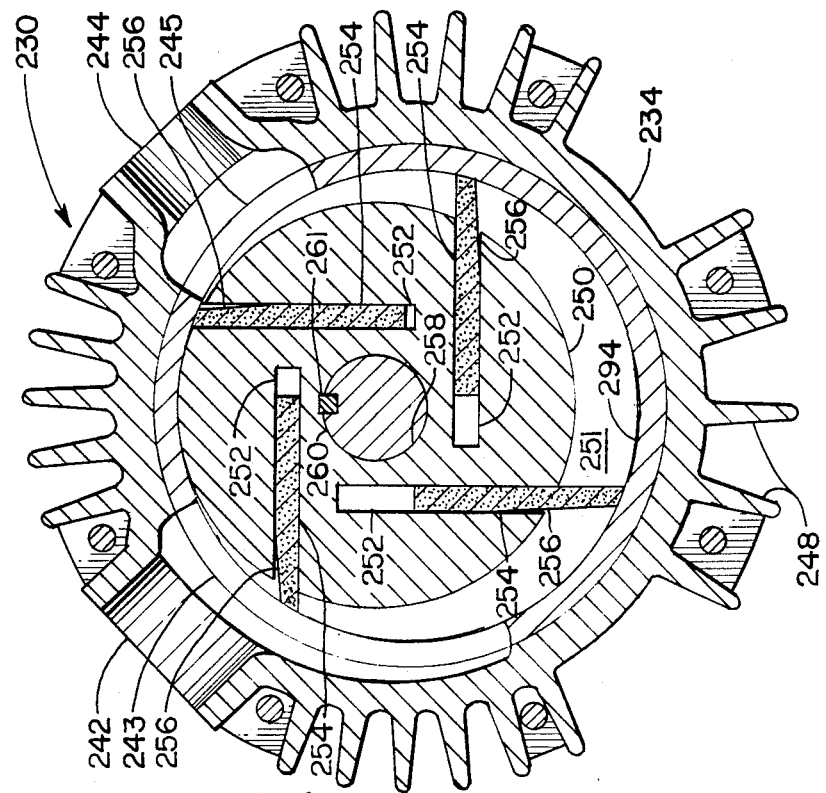
FIG. 13 is a cross sectional view of the pump taken along lines 13—13 of FIG. 10.
Figure 12:
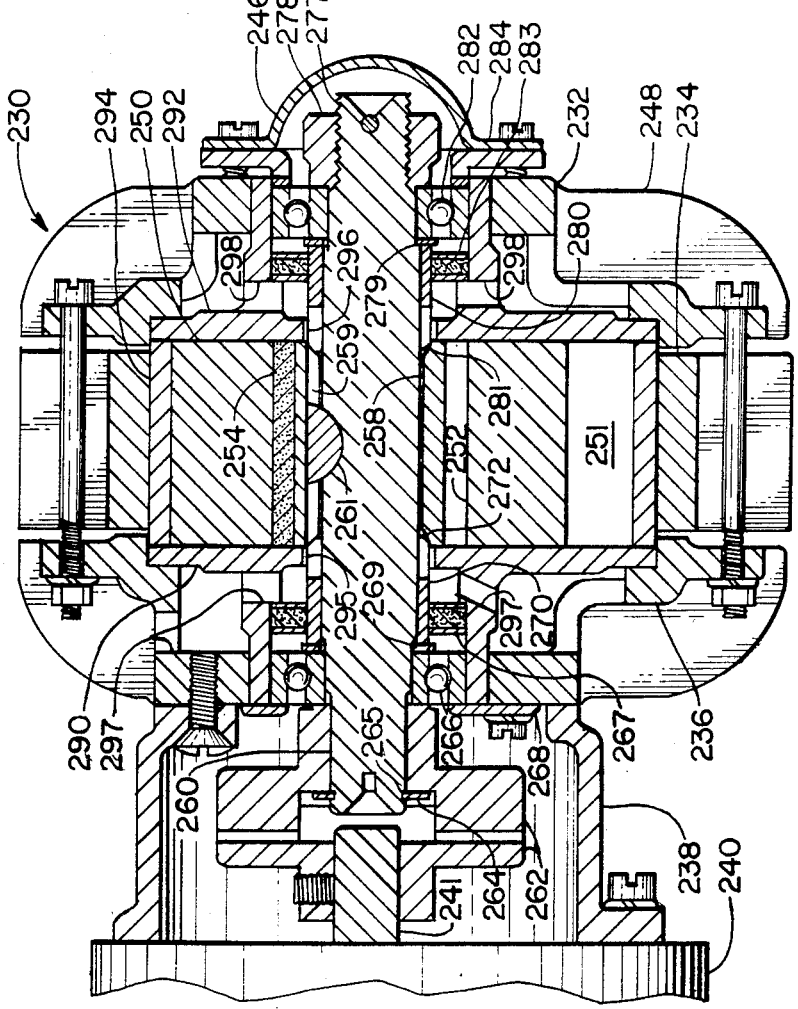
FIG. 12 is a cross sectional view of the air pump taken along lines 12—12 of FIG. 11.

The pump rotor 250 shown in FIGS. 12, 13, and 14 is essentially a solid cylindrical shape mounted concentrically on a main pump shaft 260. The pump shaft 260 and rotor 250 are positioned eccentrically in the pump chamber 251. A plurality of vane slots 252 extend into the rotor 250 from the peripheral surface thereof, and pump vanes 254 are slidably inserted into the pump vane slots 252. The pump vanes 254 are preferably fabricated of graphite which, when operating with a minimal amount of moisture in the air, exhibits excellent non-frictional wear resistant characteristics against cast iron, such as the liner 294 and container housing 290, 292.

In operation, as the rotor 250 rotates at a high speed, centrifugal force causes the pump vanes 254 to be biased outwardly in relation to the rotor 250 against the internal surface of the liner 294. Therefore, as the rotor 250 turns within the chamber 251, the vanes 254 reciprocate inwardly and outwardly of the vane slots 252 to conform to the varying distance between the liner 294 and the rotor 250 at various points about the periphery of the rotor 250 in the eccentric chamber 251.

Figure 16:
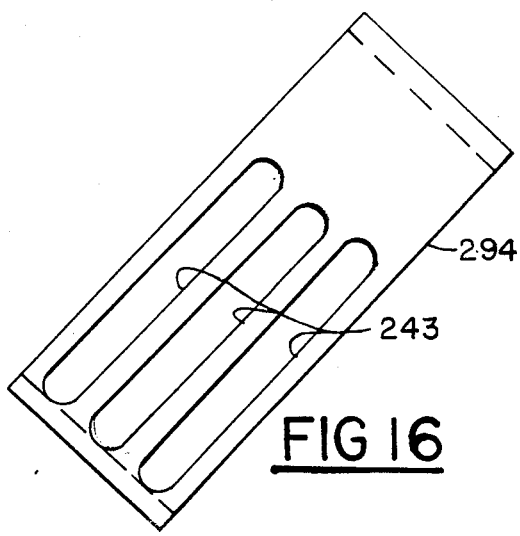
FIG. 16 is a plan view of the liner of the pump looking down at the intake port.

As shown in FIGS. 16 and 17, the liner 294 has a plurality of elongaged slots 243 therethrough in alignment with the intake port 242 and a plurality of exhaust slots 245 therein in alignment with the exhaust port 244. Therefore, as the rotor 250 rotates, and the vanes 254 slide along the interior surface of liner 294, air is drawn into the pump chamber 251 through the intake port 242 and intake slots 243, moved by the vanes through the pump chamber 251 and compressed slightly therein, and ultimately discharged through exhaust slots 245 and exhaust port 244. The exhaust port 244 is relatively large in relation to the pump chamber 251 to minimize or eliminate back pressure at the exhaust port 244. For example, the ratio of the cross-sectional area of the exhaust port 244 to the cross-section area of the largest portion of the chamber 251 is 1 to 1. The ratio of the cross-sectional area of the exhaust port to the cross-sectional area of the largest part of the chamber is 1 to 2. This feature is essential to obtain the isothermal characteristics of the air flow system of this oxygen concentrator invention and to reduce any temperature increase due to adiabatic compression effects. This combination of a relatively large exhaust port, along with the aluminum casing and cast iron liner results in an efficient air pump capable of producing a relatively high volume, low pressure flow of air through the exhaust port with almost negligible vane friction on the liner 294 and efficient dissipation of any heat produced through the highly efficient heat radiation characteristics of the aluminum casing. The fins 248 on the aluminum casing 234 further enhance heat dissipation from the pump, thereby enhancing the isothermal, low heat air stream produced by this pump.

The relatively small size of the pump in combination with the aluminum casing also enhances the lightweight, efficient component design deemed to be important in a useful oxygen concentrator system according to this invention. In order to maintain a sufficient volume of air flow within these parameters, it is necessary to maintain the tolerance between the edges of the vanes 254 and the container housings 290, 292 to a very close range of approximately 0.002 of an inch. In order to assemble the pump components and maintain this strict tolerance between the vanes 254 and container housings 290, 292, this pump 230 has been designed with a specially adapted unique main shaft and rotor structure and mounting arrangement. As shown in FIG. 12, the main shaft 260 is journaled for rotation in the front and rear end casings 232, 236 in ball bearings 282, 266, respectively. An annular groove 265 is provided adjacent the rear end of the pump shaft 260, and a snap ring 264 is positioned therein. When the snap ring 264 is positioned in the annular groove 265, it is immovable longitudinally in relation to the shaft 260. A component of the motor coupling 262 is mounted on the main shaft 260 adjacent and bearing against the snap ring 264. The front end surface of the coupler 262 bears against the ball bearing 266 in the rear casing 236. The coupler 262 connects the main pump shaft 260 to the motor shaft 241.

Figure 15:
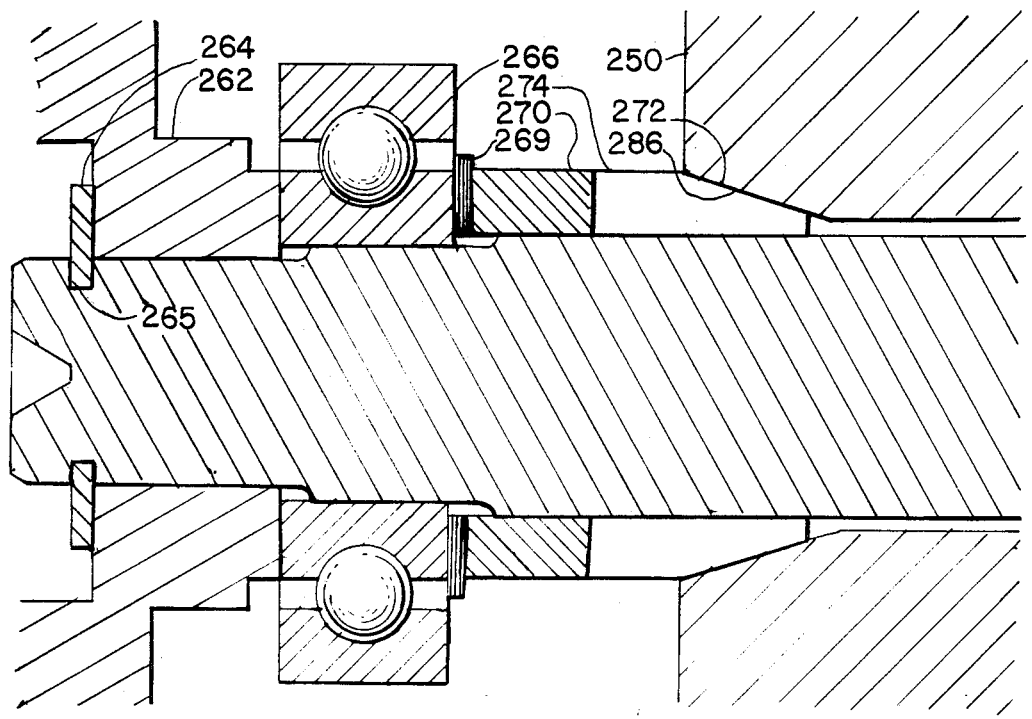
FIG. 15 is an enlarged cross sectional view of the collet rotor mounting of the pump.

The rotor 250 is mounted on the main shaft by a pair of collets 270, 280 as best seen in FIGS. 12, 14, and 15. The rear collet 270 has an axial bore 276 extending therethrough, a tapered nose portion 272 on its front end, and a plurality of contraction slots 274 extending from the tapered nose portion 272 rearwardly into the main cylindrical body portion of the collet 270. Similarly, the front collet 280 has an axial bore 287 extending therethrough, a tapered nose portion 281, and contraction slots 285. These collets 270, 280 are mounted on the main shaft 260 as shown in FIGS. 12 and 15 on opposite sides of the rotor 250. The rotor 250 has an axial board 258 extending therethrough, the external edges ends of which are flared outwardly as indicated at 286, 288. The conically outward flared portions 286, 288 of the central bore 258 in rotor 250 correspond in angle and diameter with the conical end tapered nose portions 272, 281 of the respective collets 270, 280. Therefore, when the nose portions 272, 281, of the collets 270, 280 are positioned in the respective flared portions 286, 288 of the rotor 250 and squeezed together by longitudinal force, the rotor 250 is effectively mounted on the collets 270, 280 in very precise concentric relation to the shaft so that precise alignment of the rotor with virtually no wobbles in the pump chamber 251 can be achieved.

Longitudinal alignment of the rotor 250 within the pump chamber 251 to maintain the approximately 0.002 of an inch tolerance between the vanes 254 and container housings 290, 292 is achieved by positioning a correctly calculated and measured thickness of shims 269 between the rear end of collet 270 and the ball bearings 266. Similar spacer shims 279 are positioned between the front collet 280 and front ball bearing 282 as shown in FIG. 12. Therefore, when the retainer nut 278 is tightened down on the front end of the main shaft 260, all of the components are pressed longitudinally to bear against the snap ring 264 positioned in annular groove 265, which is immovable. Therefore, with the appropriate shim spacers 269 positioned between the collet 270 and ball bearing 266, the rotor 250 will maintain precise alignment and clearance in the pump chamber 251 between container housings 290, 292. In this manner, the rotor 250 is not mounted directly on the main shaft 260, but is mounted via the collets 270, 280 so that there is a slight gap between the interior bore 258 of the rotor 250 and the main shaft 260. However, a key way 259 is provided in the rotor 250, and a half moon key 261 is positioned therein to prevent any angular slipage between the main shaft 260 and the rotor 250 during operation.

Narrow gaps 295, 296 are maintained between the collets 270, 280 and the respective container housings 290, 292 to allow any air that escapes between the vanes 254 and the container housings 290, 292 to bleed to the exterior, thereby eliminating back pressure that might otherwise be created. Appropriate vent holes 297, 298 are provided in the respective casings 236, 232 to vent such bleed air to the atmosphere. Since any bleed air that might escape in this manner is in an area of potential wear between the side edges of the vanes 254 and the container housings 290, 292, such air is likely to contain some minute graphite particles eroded away from the graphite vanes 254. Therefore, annular seals 267, 283 are provided in the end casings 236, 232 to keep such graphite particles away from the ball bearings 266, 282, respectively.

Another significant feature of the pump 230 of this invention is the tapered end 256 of the vanes 254, as best seen in FIG. 13. A common characteristic of graphite vane pumps similar to this design is that an accessive amount of wear in the graphite vanes 254 is experienced near the opening of the vane slots 252. Such erosion of the graphite vanes 254 is harmless in most industrial applications. However, in an oxygen concentrator system such as the one of the present invention, which is designed for life support and human consumption, graphite particles in the air or oxygen produced for consumption by the patient may be deleterious to the patients health and is highly undesirable. While a graphite filter, such as the graphite filter 223 shown in FIG. 8 is included in the design, it is highly desirable to eliminate to the extent possible production of graphite dust in the air stream. Since the primary source of production of grahite dust is a result of the wear and erosion of the graphite vanes 254 in the area of the vane opening as described above, the design of this pump 230 includes a tapered end portion 256 on the graphite vanes 254, as shown in FIG. 13. This tapered end portion does not adversely affect the operating function of the vane; however, it is effective to eliminate the vane wear and graphite erosion in that area. Therefore, deleterious graphite particles are kept to an absolute minimum in the air stream produced by this pump.

Figure 18:
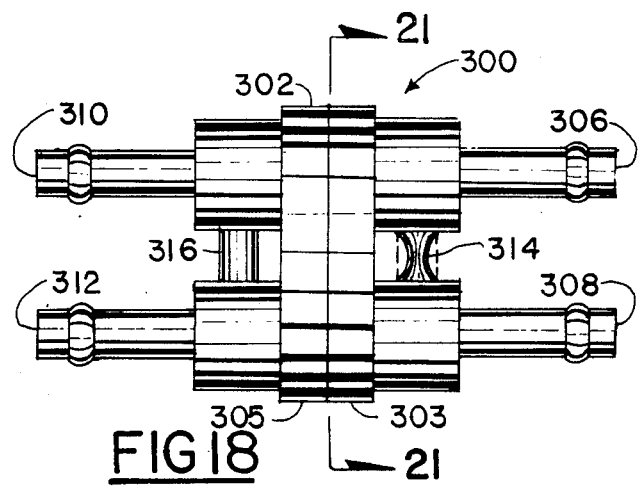
FIG. 18 is a side elevation view of the balance and flow control valve of the improved oxygen concentrator of the present invention.
Figure 19:
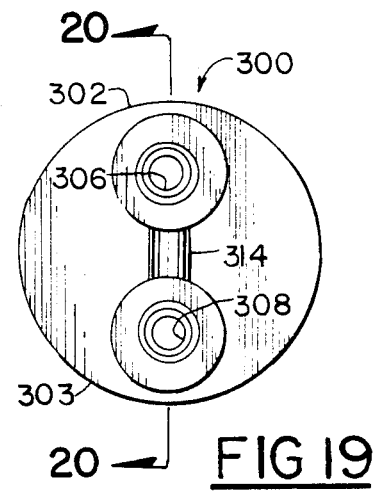
FIG. 19 is an end elevation view of the control and balance valve.
Figure 20:
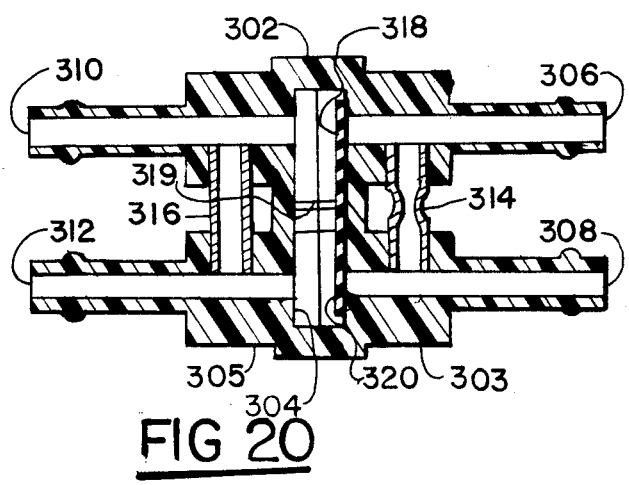
FIG. 20 is a cross sectional view of the control and balance valve taken along lines 20—20 of FIG. 19.
Figure 21:
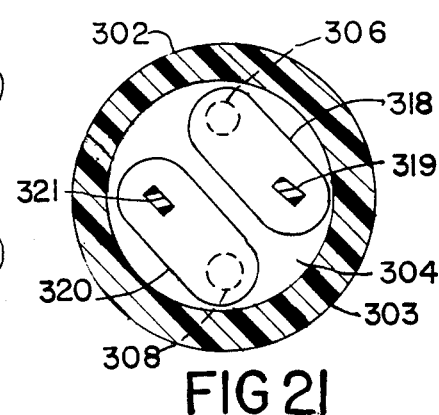
FIG. 21 is a cross sectional view of the control and balance valve taken along lines 21—21 of FIG. 18.

The combination operation and balancing valve 300 of the present invention is shown in more detail in FIGS. 18 through 21. The valve body 302 is preferably comprised of two identical half body portions 303, 305. A valve chamber 304 is enclosed within the valve body 302. Two inlet ports 306, 308 extend into the chamber 304 through the half portion 303 of the valve body 302. Likewise, two exhaust ports 310, 312 extend into the chamber 304 through the right half portion 305 of the valve body 302. Two transverse anchor posts 319, 321 extend through the chamber 304 as shown in FIGS. 20 and 21, and flexible valve membranes 318, 320 are mounted respectively thereon. Membrane 318 anchored on post 319 extends over the opening of port 306 into the chamber 304. Likewise, membrane 320 which is mounted on post 321 extends over the entrance of port 308 into the chamber 304. These membranes are effective to allow a full stream of air to flow virtually unrestricted through ports 306, 308 into the chamber 304; however, they prevent a reverse flow from chamber 304 outwardly through either chamber 306 or 308 by seating against the ports where a negative pressure is experienced. Therefore, the effect of these membranes 318, 320 in combination with the ports 306, 308 is to have two one-way valves in one valve embodiment feeding into a common chamber 304.

As shown in FIGS. 18 through 20, the valve 300 also includes a transverse tube 314 extending between and connecting ports 306, 308. This port allows enriched oxygen from one port to be shunted across to the other port. This feature allows some of the enriched oxygen produced from one sieve bed to be bled off into the outlet portion of the other sieve bed while the remaining concentrated oxygen produced is flowed through the chamber 304 and into the product tank 231. For example, as the first sieve bed 211 is under increasing positive pressure and enriched oxygen is being produced therein, the oxygen enriched stream of air is flowed from the outlet end of sieve bed 211 through port 306 and into chamber 304 from where it flows outwardly through port 310 to the product tank 231. At the same time, as described above, the second sieve bed 215 is exhausted to the atmosphere, thereby creating a lower pressure in port 308. Consequently, the higher pressure of the air stream in port 306 pushes the membrane 318 away from the port and allows flow into the chamber 304. At the same time, the other membrane 320 is forced onto port 308, thus prohibiting flow of air or oxygen enriched air from chamber 304 back into port 308. However, some of the oxygen enriched stream of air in port 306 is shunted through tube 314 into port 308 to flow back into the outlet end of the second sieve bed 215 to enrich that sieve bed in the "bootstrapping" oxygen concentration method described above.

Also as described above, it is necessary to initially set an appropriate balance between the portion oxygen enriched air delivered to the product tank and the portion of the oxygen enriched air shunted into the opposite sieve bed for further "bootstrap" enrichment. The tube 314 in the valve 300 of this invention accomodates this balancing requirement. The tube 314 is preferably fabricated of a soft metal which can be deformed as shown in FIGS. 18 and 20 to partially close off the port therethrough. Therefore, as the oxygen concentrator is set up during manufacture, the correct balance is set by squeezing the tube 314 to deform it to restrict the cross-section area therein an appropriate amount so that the optimum or desired balance is achieved. Once the balance is set in this manner, it is permanent and will not vary throughout the life of the oxygen concentrator apparatus.

Because of cost efficiency, the valve 300 is fabricated with two identical halves as shown in FIGS. 18 and 20; however, it needn't be. As can be appreciated, the shunt tube 316 is not on the exhaust side of outlet valve 300 has not function and could be eliminated, as could the second port 312. However, in the present oxygen concentrator system, it has been found convenient to keep the port 312 for connection thereto of appropriate pressure monitoring apparatus, such as the pressure gauge 229 shown in FIG. 8.

In utilizing the isothermal high volume, low pressure concept of this improved oxygen concentrator design, an appropriate flow rate from the pump is about 240 to 260 liters per minute for a sieve bed having a volume of about 480 cubic inches and containing about 8 pounds of zeolite. In this kind of system, the exhaust or purge cycle occurs very quickly. About $\frac{2}{3}$ of the pressure in the bed is bled off within the first second because of the unrestricted ports through the system, including the sequencer valve 310. At the same time the pressure gradient on the opposite sieve reaches a maximum pressure of about $8\frac{1}{2}$ psi to $9\frac{1}{2}$ psi in about an 18-second interval. When operating in this manner, approximately 95% pure oxygen product can be produced at a flow rate of about 4 liters per minute.

While the present invention has been described with some degree of particularly, it should be appreciated that the present invention is defined by the following claims construed in light of the prior art so that modifications or changes may be made to the preferred embodiment of the present invention without departing from the inventive concepts contained herein.

What we claim is:

1. Oxygen concentrator apparatus, comprising:
   two beds of zeolitic material, each bed being in an enclosed container;
   a pump for pumping air into said zeolitic bed, said pump having an internal chamber, an intake port for conducting air into said chamber, an exhaust port for conducting air out of said chamber, and air moving means for moving air from said intake port to said exhaust port, said exhaust port being sufficiently large in relation to said chamber to result in substantially isothermal air flow through said pump;
   sequence valve means for directing air from said pump first to one of said zeolitic beds while exhausting the other zeolitic bed to the atmosphere, and alternately, for directing air from said pump to said other zeolitic bed while exhausting said one zeolitic bed to the atmosphere, said valve means having internal ducts and ports therein at least as large in cross-sectional area as said exhaust port on said pump such that there is no restriction to air flow therethrough, and
   air flow pipes connecting said exhaust port to said sequence valve means and connecting said sequence valve means to said beds, all of said air flow pipes having cross-sectional areas at least as large as the cross-sectional of said exhaust port such that there is no restriction to air flow therethrough.

2. The oxygen concentrator apparatus of claim 1, including combination flow and balance control valve means connected to both zeolitic beds for allowing oxygen-enriched air from each bed to flow from each bed to oxygen product storage means while said beds are pressurized while preventing back flow of oxygen-enriched air from the product storage means to said beds when said beds are purged and exhausted to the atmosphere, and while also bleeding a portion of the oxygen-enriched air from one bed to the other bed while the one bed is being pressurized and the other bed is being purged and vice versa, said combination flow and balance control valve being comprised of a valve body enclosing an interior chamber, three ports extending through said valve body into said chamber, two of said ports being intake ports, each of said intake ports being connected to opposite ones of said beds, and the remaining one of said ports being an outlet port, two flexible membranes mounted in said chamber, each membrane covering a different one of said intake ports and adapted to move away from the port when there is a higher pressure in the port than in the chamber and to move against and seal the port when there is a lower pressure in the port than in the chamber, and a cross-bleed port extending between and connecting said intake ports.

3. The oxygen concentrator apparatus of claim 2, wherein said bleed port is adjustable to restrict the amount of oxygen-enriched air flowing therethrough to a desired proportion of the quantity of oxygen-enriched air flowing through said intake ports.

4. The oxygen concentrator apparatus of claim 3, wherein said cross-bleed port is a soft metal tube that is easily deformable to reduce the cross-sectional area thereof.

5. The oxygen concentrator apparatus of claim 1, wherein said chamber in said pump is enclosed by a cylindrical liner of circular cross section and said air moving means includes a cylindrical rotatable rotor of smaller diameter than said chamber and mounted eccentrically in said chamber, said rotor having a plurality of slots opening therein from the peripheral surface and a vane slideably positioned in each slot, each of said vanes having a tapered trailing side adjacent the distal end portion to reduce wear and erosion of said vanes at the mouths of said slot openings.

6. The oxygen concentrator apparatus of claim 5, including lateral end containers enclosing the ends of said pump chamber and a casing enclosing said liner and said end containers, said liner and said end containers being fabricated of cast iron for low friction and high wear resistance to said vanes and said casing being fabricated of aluminum for reduced weight and increased heat dissipation capacity to enhance the isothermal flow of air therethrough.

7. The oxygen concentrator apparatus of claim 6, wherein each of said zeolite beds are approximately 480 cubic inches in volume containing about 8 pounds of zeolite material, said air pump moves about 240 to 260 liters per minute of air through the beds where the positive pressure gradient in a cycle of the oxygen concentrator is from 0 psi to about 8.5 to 9.5 psi in about 18 seconds while in the purge cycle at least two-thirds of the pressure in the bed is released within one second.

8. The oxygen concentrator apparatus of claim 7, wherein the ratio of the cross-sectional area of said exhaust port in said pump to the cross-sectional area of the largest part of said chamber between the rotor and the liner is about 1 to 1.

9. In the method of concentrating oxygen, utilizing the steps of pumping air through one zeolitic bed while purging and exhausting air from a second zeolitic bed by venting said second zeolitic bed to the atmosphere from one end and directing a portion of oxygen-enriched air from said first bed into the opposite end of said second bed and vice versa in sequential steps, the improvements comprising the steps of pumping and flowing the air isothermally into said beds through conduits and valves, all of which have no restrictions in cross-sectional area therethrough from the air pump to the beds.

10. The improvement of claim 9, including the steps of pumping air into the zeolitic beds at a rate of about 240 to 260 liters per minute creating a positive pressure gradient in the charging phase of the cycle of about 0 p.s.i. to the range of about 8.5 to 9.5 p.s.i. in about 18 seconds and a negative pressure gradient in the purge phase of the cycle wherein at least two-thirds of the pressure in the zeolitic bed is lost within one second.

11. Oxygen concentrator apparatus, comprising two zeolitic beds, an air pump for pumping air into said zeolitic beds, valve means for sequencing alternating pressurization and purge cycles in said beds, product storage tank for accummulating oxygen-enriched air for patient consumption, directional control valve means and balance valve means for delivering oxygen-enriched air from the zeolitic beds to the product storage tank while preventing back flow of the oxygen-enriched air from the product storage tank to the beds during the purge phase of the cycle and for directing a portion of the oxygen-enriched air produced in the pressurization phase of one bed to the other bed during the purge cycle therein and vice versa, cannula means for delivering the oxygen-enriched air to a patient, rate flow control and meter means for adjusting the rate of flow of the oxygen-enriched air delivered to the patient, and on/off control means for turning the pump on and off, wherein said oxygen concentrator apparatus includes an enclosure for containing and housing said beds, air pump, and valve means, and a separate patient unit remote and removeable from said enclosure, said cannula means, rate flow control and meter means, and on/off control means being part of said remote patient unit and said remote patient unit also having a housing for enclosing said cannula means, rate flow control, and meter means, which housing is separate, distinct, and removeable from said enclosure for containing and housing said beds, air pump, and valve means.

12. The oxygen concentrator apparatus of claim 11, including a container and support means in said enclosure for receiving, supporting, and storing said remote patient unit.

13. The oxygen concentrator apparatus of claim 12, wherein said enclosure includes a base portion at the bottom thereof separated a spaced distance from the lateral peripheral surface of said enclosure and platform means on said base portion for supporting the beds, pump, and product tank, the space between the peripheral surface of the enclosure and the platform being an air inlet into the container means.

14. Air pump apparatus for pumping air comprising:
an internal chamber enclosed by a cylindrical liner of circular cross section, an intake port for conducting air into said chamber, an exhaust port for conducting air out of said chamber, and air moving means for moving air from said intake port to said exhaust port, wherein said air moving means includes a rotatable rotor of smaller diameter than said chamber and mounted eccentrically in said chamber, said rotor having a plurality of slots opening therein from the peripheral surface and a vane slideably positioned in each slot, each of said vanes having a tapered trailing side adjacent the distal end portion to reduce wear and erosion of said vanes at the mouths of said slot openings.

15. The air pump apparatus of claim 14, wherein said trailing side of said vane is tapered inwardly approximately 2 degrees.

16. Air pump apparatus for moving air, comprising:
an internal chamber, an intake port for conducting air into said chamber, an exhaust port for conducting air out of said chamber, a rotatable rotor of smaller diameter than said chamber and mounted eccentrically in said chamber, said rotor having a plurality of slots opening therein from the peripheral surface and a vane slideably positioned in each slot, and lateral end containers enclosing the ends of said pump chamber and a casing enclosing the ends of said pump chamber and a casing enclosing said liner and said end containers, said liner and said end containers being fabricated of cast iron for low friction and high wear resistance to said vanes and said casing being fabricated of aluminum for reduced weight and increased heat dissipation capacity to enhance the isothermal flow of air therethrough.

17. The air pump apparatus of claim 16, wherein said rotor has an axial bore extending therethrough, said bore being flared conically outward at each end, a main shaft extending through said bore, two collets, each of which has an axial bore and a concentric inwardly tapered nose portion that is tapered at a size and angle corresponding to the conical flared ends of said rotor axial bore, and slots extending transversely through said tapered nose portion, said collets being mounted on said main shaft on opposite sides of the rotor with the tapered nose sections inserted into said respective flared ends of said rotor bore, and tightening means for tightening said collets axially onto said rotor.

18. The air pump apparatus of claim 16, including anchor means on said main shaft for prohibiting axial movement of said collets and spacer means between said anchor and the nearest collet to said anchor means for positioning said rotor axially on said main shaft.

19. In oxygen concentrator apparatus having two beds of zeolitic material, a pump for pumping air into each zeolitic bed, sequencing valves for directing air from the pump first to one of the zeolitic beds while exhausing the other zeolotic bed and vice versa, directional control for delivering oxygen enriched air to a product storage tank while preventing back flow of the oxygen enriched air from the product storage tank to the beds, and a balance valve for directing a portion of the oxygen enriched air from one tank to the other, the improvement comprising:

a combination flow and balance control valve including a unitary valve body enclosing an interior chamber, three ports extending through said valve body into said chamber, two of said ports being intake ports, each of said intake ports being connected to opposite ones of said beds, and the remaining one of said ports being an outlet port, two flexible membranes mounted in said chamber, each membrane covering a different one of said intake ports and adapted to move away from the port when there is a higher pressure in the port than in the chamber and to move against and seal the port when there is a lower pressure in the port than in the chamber, and a cross-bleed port extending between and connecting said intake ports.

20. The improvement of claim 19, wherein said bleed port is adjustable to restrict the amount of oxygen enriched air flowing therethrough to a desired proportion of the quantity of oxygen-enriched air flowing through said intake ports.

21. The improvement of claim 20, wherein said bleed port is a soft metal tube that is easily deformable to reduce the cross-sectional area thereof.

* * * * *